United States Patent [19]

Yoshida et al.

[11] 4,040,502

[45] Aug. 9, 1977

[54] HYDRAULIC POWER STEERING

[75] Inventors: Hiroshi Yoshida, Toyokawa; Hajime Kozuka; Toyoshi Sakano, both of Okazaki; Yoichiro Honda, Kasugai; Shojiro Omuro, Nagoya, all of Japan

[73] Assignees: Mitsubishi Jidosha Kogyo Kabushiki Kaisha; Mitsubishi Jukogyo Kabushiki Kaisha, both of Japan

[21] Appl. No.: 598,402

[22] Filed: July 23, 1975

[30] Foreign Application Priority Data

July 24, 1974 Japan .............................. 49-88848[U]

[51] Int. Cl.² .............................................. B62D 5/06
[52] U.S. Cl. ................................. 180/149; 137/625.69
[58] Field of Search ............... 180/79.2 R; 91/375 A; 137/625.69

[56] References Cited

U.S. PATENT DOCUMENTS

| 2,885,020 | 5/1959 | Herbenar | 180/149 |
| 2,964,017 | 12/1960 | Hruska | 180/79.2 R X |
| 3,630,233 | 12/1971 | Miyamoto | 91/375 A X |
| 3,693,470 | 9/1972 | Masuyama | 91/375 A X |
| 3,763,951 | 10/1973 | Kristof | 180/79.2 R |
| 3,877,540 | 4/1975 | Masuda | 180/79.2 R |

Primary Examiner—Joseph F. Peters, Jr.
Assistant Examiner—R. Schrecengost
Attorney, Agent, or Firm—Robert E. Burns; Emmanuel J. Lobato; Bruce L. Adams

[57] ABSTRACT

In a hydraulic power steering system which transmits a steering force from a steering shaft through a gear train to a drag link, an actuator is disposed in a position spaced from a detector of the steering input so as to transmit an auxiliary steering force to the drag link.

7 Claims, 3 Drawing Figures

HYDRAULIC POWER STEERING

BACKGROUND OF THE INVENTION

The present invention relates to a hydraulic power steering system to be used primarily for automobiles.

Generally in the steering system of an automobile, steering force is transmitted from the steering shaft through the gear train to the drag link. In a hydraulic power steering of conventional type, means for detecting steering force applied on the steering shaft and an auxiliary steering actuator which operates according to the value of input detected by said detecting means are included in the gear box of said gear train. This not only makes the structure of the gear box complex, but also enlarges the size of the entire power steering system, which, in turn, makes it difficult to mount it in a vehicle.

The object of this invention is to solve such problems by providing a hydraulic power steering which is formed with simplified structure and is designed to occupy a reasonable space in a vehicle by separating said actuator from the gear box.

SUMMARY OF THE INVENTION

In the new system, which transmits the steering force from the steering shaft through the gear train to the drag link, there is also provided means for detecting the input of the steering force applied on the steering shaft. An actuator, which is operated by the pressure oil supplied through a change-over valve according to the value of input measured by said detecting means, is disposed apart from the detecting means, so as to transmit the auxiliary steering power to said drag link through a transmission arm.

BRIEF DESCRIPTION OF THE DRAWINGS

Now a hydraulic power steering for automobile use, which is an embodiment of this invention, will be described with reference to the accompanying drawings, in which.

DESCRIPTION OF THE PREFERRED EMBODIMENT

Figure 1:
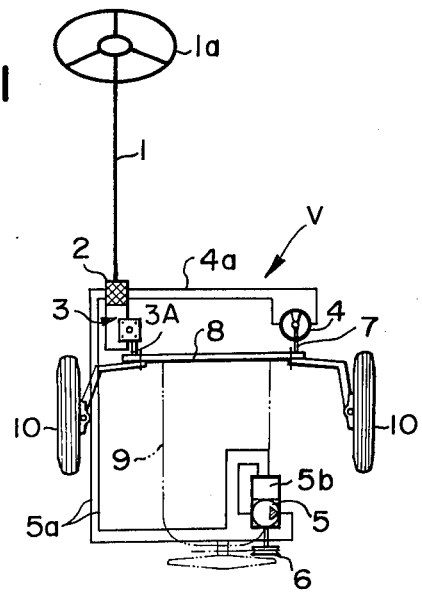
FIG. 1 is a plan view schematically showing the overall structure of the power steering system.

As shown in FIG. 1, the vehicle V has a manually operated steering system in which the steering force is transmitted from a steering wheel 1a by a steering shaft 1 to one end of a drag link 8 of vehicle V by way of a gear train in a gear box 3. There is also provided a control section 2 which contains means B for detecting the steering force applied by wheel 1a to the steering shaft 1 and a change-over valve M that supplies pressure oil according to the value of steering input measured by said detecting means. Of course the steering system 1, 2, 3, 8 is suitably mounted on the frame of vehicle V (not shown).

Further, an actuator 4, which is operated by said pressure oil supplied through an oil tube 4a, is disposed in vehicle V, in a position apart from the control section 2, so that it can transmit an auxiliary steering force through a transmission arm 7 to the drag link 8.

Also, a pump 5, worked by the automobile engine 9 through a pump pulley 6, is provided to circulate the pressure oil through an oil tube 5a to the change-over valve M in the control section 2.

Details of the control section 2 will be described next, referring to FIGS. 2 and 3. Item A is a hollow input shaft serrated connected to the steering shaft 1, intended for transmitting the steering input from the steering shaft 1 to the gear train, not shown, which can be, as usual, disposed in the gear box 3 to operate the drag link 8 by the usual pitman 3A (FIG. 1). Item B is a torsion bar, which as shown is disposed centrally of hollow shaft A. This bar B has a first end at right, secured to hollow shaft A, and has a second end, at left, whereby the bar constitutes a steering input detecting means, interposed between the input shaft A and a rotor D to produce a relative angular displacement therebetween in proportion to the level of the input applied on the input shaft A. Item C is a housing that is fitted to the gear box 3 liquid-tightly at 3-C. The rotor D is engaged, with a detector output shaft F entering the gear box 3, by means of serrations 11 so as to permit no play. It is also fitted in the housing C liquid-tightly and smoothly rotatably, by the use of rotating seals G. This rotor D is provided with a spool M, which is fitted at right angles to the axis of the rotor D and serves as a changeover valve of the four-side throttle valve type. A communication passage K extends through rotor D along the axis thereof, connecting oil chambers $R_1$ and $R_2$ provided at both ends of the rotor D. This rotor also has a circumferential groove $S_O$, providing a passage through which the oil supplied to the spool M flows.

The spool M in the rotor D is displaced by the input shaft A. An input pin H projecting from the input shaft A is engaged with a central groove cut in the spool M, whereby the spool M is displaced when a relative angular displacement is produced between the input shaft A and the rotor D by torsion of detector bar B.

Item N is a supply port through which the pressure oil from the pump 5 is supplied to the spool M. Item $\phi$ is an exhaust port to oil chamber $R_2$ in housing C. Items P and Q are ports through which the pressure oil from the pump is introduced to the actuator 4, the oil being switched by the spool M when angular displacement arises between the input shaft A and the rotor D.

Figure 2:
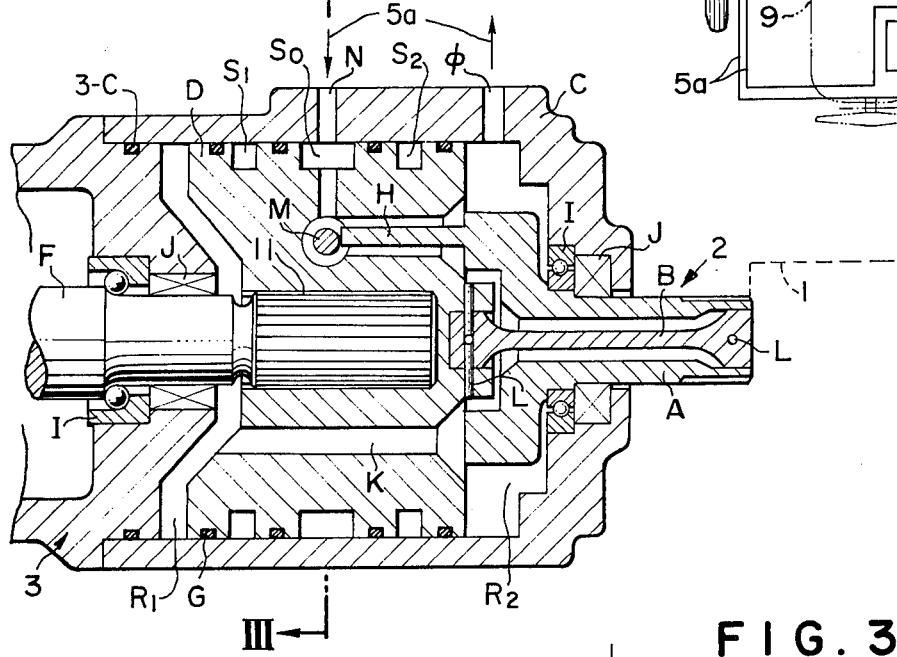
FIG. 2 is a longitudinal cross-sectional view of its control section.
Figure 3:
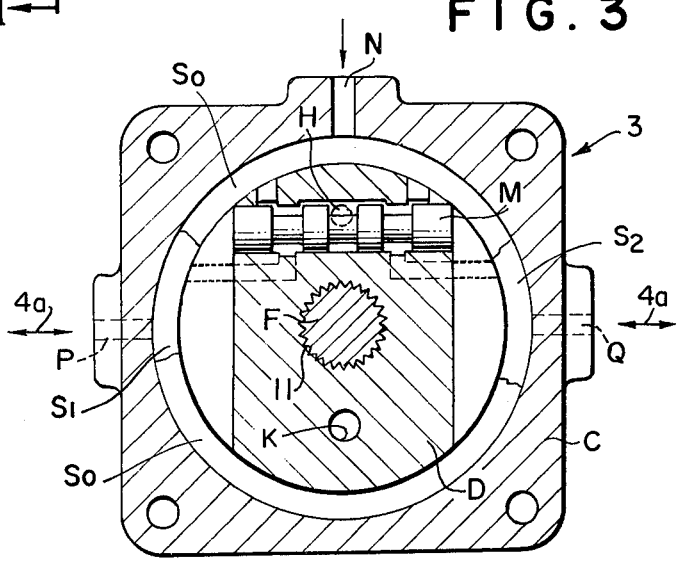
FIG. 3 is a transverse section taken generally along the line III—III of FIG. 2.

In FIGS. 2 and 3, reference character I denotes bearings, J an oil seal, and L a lock pin, respectively.

When the driver rotatingly operates steering wheel 1a shown in FIG. 1, the input shaft A is rotated through the steering shaft 1. In case the steering wheel 1a is rotated lightly, that is, when the torsion bar B interposed between the input shaft A and the rotor D is not twisted because only minor resistance is offered by the ground to road wheels 10 of vehicle V, the input shaft A and the rotor D turn integrally, as a consequence of which the rotating force is transmitted to the output shaft F in the gear box 3, which output shaft is directly connected with the rotor D, just the same as in the case of direct manual operation through the gear train.

In this case, the spool M in the rotor D is kept in a neutral position, so that the pressure oil from the pump 5 flows through the supply port N, annular groove So on the periphery of the rotor D, the central groove of spool M and along point H to chamber $R_2$ and the exhaust port $\phi$ into a reservoir tank 5b.

The piston of the actuator 4 does not in this case function as an auxiliary power source to assist in the operation of the steering wheel 1a, since by virtue of passage K there is no pressure difference between oil chambers $R_1$, $R_2$ at both ends of housing C.

In constrast, when much force is applied to the steering wheel 1a, that is, when the torsion bar B between the input shaft A and the rotor D becomes twisted under the influence of great resistance offered by the ground to the road wheels 10, the input pin H provided at the front end of the input shaft A displaces the spool M. Consequently, the pressure oil fed from the pump 5 through the supply port N is supplied to the actuator 4, after being switched by the spool M, either by way of an annular groove $S_1$ on the periphery of the rotor D and the port P or by way of a similar annular groove $S_2$ and the port Q. As a result, the displacement input to drag link 8 from the gear train in the gear box 3 and that produced by the oil pressure in the actuator 4 fitted to the arm 7 are combined to facilitate the operation of the steering wheel 1a.

The effects and advantages offered by the hydraulic power steering of this invention are enumerated in the following:

1. Because the gear train and the gear box of the manual steering system can be used, the range of options permissible to an automobile may be expanded.

2. The actuator 4 is disposed so that it can drive the idler arm 7 from a position apart from the gear box 3. This reduces the size of the gear box 3, which, in turn, proves conducive to increasing its strength and permits rational allocation of space to individual equipment in the automotive vehicle.

3. Since the actuator 4 is not placed in the gear box 3, it is unnecessary to consider the influence of heat from the exhaust system even in the case of a vehicle having a muffler on its right.

4. The elimination of the actuator 4 from the gear box 3 permits forming the passage K in the rotor D and omitting thrust bearings to support the rotor D.

5. The actuator 4 is fixed to the frame opposite the gearbox 3. This permits providing equal rigidity on both sides of the car frame, which improves its proper collapsing on collision. Further, even if power steering is provided, the actuator does not interfere with the engine, transmission, or other parts. This is advantageous in laying out the entire car. Also, the inertial mass of the linkage system does not increase, nor will there by any adverse effect on its vibration resistivity.

6. Since the actuator 4 can be fitted with the linkage system in just the same way as the gearbox 3, this not only facilitates assembling, but also permits the linkage for manual steering to be used as it is. Thus a manual steering car and a power steering car can be made of the same parts, and large production is facilitated.

7. There is no need to provide any movable portion in the tubing between the gearbox 3 and actuator 4; therefore, metal tubing can be used. This increases the reliability of the tubing, and facilitates tube fitting.

8. The actuator 4 can be rotated in both directions on the same output torque, and its output fluctuations are relatively small. The limited output variation is conducive to increase the strength of the actuator and its auxiliary parts, because the actuator is needed to produce a minimum output above a certain level.

What is claimed is:

1. A hydraulic power steering system, comprising:
    a drag link having first and second end portions disposed respectively on first and second side portions of a vehicle;
    a steering shaft for the vehicle disposed on the first side portion and having an end portion adjacent the first end portion of the drag link;
    a steering gear box interposed between the end portion of the steering shaft and the first end portion of the drag link and mounted on the first side portion of the vehicle, the gear box having a pitman arm for displacing the drag link laterally of the vehicle to steer the vehicle if a steering input is applied to the steering shaft;
    a changeover valve disposed on the first side portion and interposed between the end portion of the steering shaft and the gearbox;
    control means for operating the changeover valve in accordance with the steering input;
    an actuator disposed on the second side portion of the vehicle and having a power assist arm rotatable thereby to assist the pitman arm's displacing of the drag link; and
    a pressure system controlled by the changeover valve for operating the actuator, which pressure system includes a pressure source, a pressure sink, and rotary passage means disposed on the first side portion and defining a first pressure passage to interconnect the pressure source and the pressure sink with ports of the changeover valve, and a second pressure passage to interconnect other ports of the changeover valve with the actuator for operating the actuator and thereby the power assist arm and the drag link in response to the operating of the changeover valve,
    the rotary passage means comprising a control housing, a rotor therein, means at the end portion of the steering shaft for thereby rotating the rotor in response to rotation of the steering shaft, and means in the rotor for slidably supporting the changeover valve for operation of the valve, independent of the rotating of the rotor, to control the actuator;
    the pressure system also including pressure chambers in the control housing, at both ends of the rotor, the rotor having a passage therein, interconnecting the pressure chambers to equalize pressures in the chambers and thereby to facilitate the rotating of the rotor by the end portion of the steering shaft;
    the actuator being remote from the gearbox, being disposed adjacent the second end portion of the drag link, and being mounted on the second side portion of the vehicle, independently of the gearbox.

2. A system according to claim 1 in which the control means of the changeover valve (M) comprises a torsion bar (B) interposed between the end portion (A) of the steering shaft (1) and the changeover valve for torsion of the bar in response to the steering input and for corresponding control of the operating of the valve and, through the pressure system, for corresponding control of the actuator, remote from the gearbox.

3. A system according to claim 1 including a link (H) secured to the end portion (A) of the steering shaft (1) for effecting the operation of the slidably supported changeover valve in the rotor (D) in response to the steering input.

4. A system according to claim 1 in which the changeover valve (M) is a spool and ports (M-N) of said valve are grooves circumferential of the spool.

5. A system according to claim 1 in which the rotor (D) has grooves ($S_o$, $S_1$, $S_2$) circumferential thereof, one for each of several ports (N, P, Q) of the housing, for said interconnecting.

6. A system according to claim 1 in which the rotor (D) has, rigidly centrally coaxially connected therewith, an output shaft (F) entering the gearbox (3) for moving the pitman arm (3A).

7. A system according to claim 1 in which the control housing (C) is stationarily mounted on and has pressure-tight connection with the gearbox (3).

* * * * *